(12) United States Patent
Weidner et al.

(10) Patent No.: US 10,000,133 B2
(45) Date of Patent: Jun. 19, 2018

(54) SYSTEMS AND METHODS FOR IDENTIFYING AN IDEAL OPERATION FREQUENCY FOR WIRELESS POWER TRANSFER

(71) Applicant: QUALCOMM Incorporated, San Diego, CA (US)

(72) Inventors: Felix Weidner, Munich (DE); Nicholas Athol Keeling, Munich (DE)

(73) Assignee: QUALCOMM Incorporated, San Diego, CA (US)

( * ) Notice: Subject to any disclaimer, the term of this patent is extended or adjusted under 35 U.S.C. 154(b) by 192 days.

(21) Appl. No.: 15/134,136

(22) Filed: Apr. 20, 2016

(65) Prior Publication Data

US 2017/0305280 A1 Oct. 26, 2017

(51) Int. Cl.
*H01F 27/42* (2006.01)
*H01F 37/00* (2006.01)
(Continued)

(52) U.S. Cl.
CPC ............ *B60L 11/182* (2013.01); *H02J 50/12* (2016.02); *H02J 50/80* (2016.02); *H02J 50/90* (2016.02)

(58) Field of Classification Search
USPC ............................................. 307/107; 191/10
See application file for complete search history.

(56) References Cited

U.S. PATENT DOCUMENTS 9,160,421 B2 * 10/2015 Kim ...................... H04B 5/0037
9,270,138 B2 * 2/2016 Yamakawa ............. H02J 50/80
(Continued)

FOREIGN PATENT DOCUMENTS

| EP | 2693600 A1 | 2/2014 |
|---|---|---|
| EP | 2717427 A1 | 4/2014 |
| WO | WO-2015001744 A1 | 1/2015 |

OTHER PUBLICATIONS

Beh T., et al., Wireless Power Transfer System via Magnetic Resonant Coupling at Fixed Resonance Frequency —Power Transfer System Based on Impedance Matching—; World Electric Vehicle Journal, EVS25 World Battery, Hybrid and Fuel Cell Vehicle Symposium, Shenzhen, China, Nov. 5-9, 2010, vol. 4; pp. 00744-00753.

(Continued)

*Primary Examiner* — Adam Houston
(74) *Attorney, Agent, or Firm* — Knobbe, Martens, Olson & Bear, LLP (57) ABSTRACT

The present disclosure described herein relates to wireless power transfer systems and methods that efficiently and safely transfer power to electronic devices. In an aspect of the disclosure, a method for wirelessly transmitting power is provided. The method includes during a first time period, transmitting power at a first power level from a wireless power transmitter to the wireless power receiver. The method further includes determining a frequency for transmitting power at a second power level based on a ratio of a current level of the wireless power receiver to a current level of a wireless power transmitter at the first power level. The method further includes during a second time period, transmitting power at the second power level and at the frequency, the first power level lower than the second power level.

30 Claims, 6 Drawing Sheets

(51) Int. Cl.
*H01F 38/00* (2006.01)
*B60L 11/18* (2006.01)
*H02J 50/12* (2016.01)
*H02J 50/90* (2016.01)
*H02J 50/80* (2016.01)

(56) References Cited

U.S. PATENT DOCUMENTS

| | | | | |
|---|---|---|---|---|
| 9,306,634 | B2* | 4/2016 | Low | H04B 5/0037 |
| 9,343,928 | B2* | 5/2016 | Bae | H04B 5/0037 |
| 9,347,168 | B2* | 5/2016 | Kim | D06F 33/02 |
| 9,520,724 | B2* | 12/2016 | Anttila | H02J 5/005 |
| 9,537,323 | B2* | 1/2017 | Maikawa | B60L 11/182 |
| 9,627,929 | B2* | 4/2017 | Kanno | H02J 50/12 |
| 9,774,086 | B2* | 9/2017 | Cook | H01Q 7/005 |
| 9,774,277 | B2* | 9/2017 | Khuri-Yakub | H02N 2/18 |
| 9,820,061 | B2* | 11/2017 | Fort | H04R 25/43 |
| 9,899,879 | B2* | 2/2018 | Faraone | H02J 50/12 |
| 2012/0286726 | A1 | 11/2012 | Kim et al. | |
| 2013/0057078 | A1* | 3/2013 | Lee | H02J 7/00 307/104 |
| 2013/0134794 | A1 | 5/2013 | Lee et al. | |
| 2013/0181539 | A1 | 7/2013 | Muratov et al. | |
| 2014/0347008 | A1* | 11/2014 | Chae | H02J 7/025 320/108 |
| 2014/0368053 | A1* | 12/2014 | Lee | H01F 38/14 307/104 |
| 2014/0375256 | A1* | 12/2014 | Lee | H02J 5/005 320/108 |
| 2015/0200563 | A1* | 7/2015 | Zhang | H02J 5/005 320/108 |
| 2016/0176300 | A1* | 6/2016 | Bucher | B60L 11/182 307/104 |

OTHER PUBLICATIONS

Fu W., et al., "Study on Frequency-tracking Wireless Power Transfer System by Resonant Coupling," IEEE 6th International Power Electronics and Motion Control Conference, May 2009, pp. 2658-2663.

Khan-Ngern W., et al., "Wireless Power Charging on Electric Vehicles," Proceedings of the International Electrical Engineering Congress, 2014, 4 pages.

International Search Report and Written Opinion—PCT/US2017/021626—ISA/EPO—dated Jun. 12, 2017.

* cited by examiner

SYSTEMS AND METHODS FOR IDENTIFYING AN IDEAL OPERATION FREQUENCY FOR WIRELESS POWER TRANSFER

TECHNICAL FIELD

This application is generally related to wireless power transfer, and in particular, identifying an ideal operation frequency for wireless power transfer.

BACKGROUND

Chargeable systems, such as vehicles, have been introduced that include locomotion power derived from electricity received from an energy storage device such as a battery. For example, hybrid electric vehicles include on-board chargers that use power from vehicle braking and traditional motors to charge the vehicles. Vehicles that are solely electric generally receive the electricity for charging the batteries from other sources. Battery electric vehicles are often proposed to be charged through some type of wired alternating current (AC) such as household or commercial AC supply sources. The wired charging connections require cables or other similar connectors that are physically connected to a power supply. Cables and similar connectors may sometimes be inconvenient or cumbersome and have other drawbacks. It is desirable to provide wireless power transfer systems that are capable of transferring power in free space (e.g., via a wireless field) to be used to charge the electric vehicle to overcome some of the deficiencies of wired charging solutions.

SUMMARY

The systems, methods, and devices of the present disclosure each have several aspects, no single one of which is solely responsible for its desirable attributes. The implementations disclosed herein each have several innovative aspects, no single one of which is solely responsible for the desirable attributes of the present disclosure. Without limiting the scope of this present disclosure as expressed by the claims which follow, some features will now be discussed briefly. After considering this discussion, and particularly after reading the section entitled "Detailed Description," one will understand how the features of the various implementations of this present disclosure provide advantages that include improved wireless charging between wireless power transmitting units and wireless power receiving units.

In an aspect of the disclosure, an apparatus for wirelessly transmitting power is provided. The apparatus may comprise a transmit circuit configured to, during a first time period, transmit power at a first power level to the wireless power receiver. The apparatus further includes a processor circuit configured to determine a frequency for transmitting power at a second power level based on a ratio of a current level of the wireless power receiver to a current level of the transmit circuit at the first power level. The transmit circuit is further configured to, during a second time period, transmit power at a second power level and at the frequency, the first power level lower than the second power level.

Another aspect of the disclosure relates to another apparatus for wirelessly transmitting power. The apparatus may comprise means for transmitting power at a first power level, during a first time period, to the wireless power receiver. The apparatus further includes means for determining a frequency for transmitting power at a second power level based on a ratio of a current level of the wireless power receiver to a current level of the transmitting means at the first power level. The apparatus further includes means for transmitting power at the second power level and at the frequency, during a second time period, the first power level lower than the second power level.

Another aspect of the disclosure relates to a method for wirelessly transmitting power to power or charge a wireless power receiver. The method includes during a first time period, transmitting power at a first power level from a wireless power transmitter to the wireless power receiver. The method further includes determining a frequency for transmitting power at a second power level based on a ratio of a current level of the wireless power receiver to a current level of a wireless power transmitter at the first power level. The method further includes during a second time period, transmitting power at the second power level and at the frequency, the first power level lower than the second power level.

Another aspect of the disclosure relates to a non-transitory computer readable storage medium comprising instructions that when executed cause an apparatus to perform a method for wirelessly transmitting power to a wireless power receiver. The method includes during a first time period, transmitting power at a first power level from a wireless power transmitter to the wireless power receiver. The method further includes determining a frequency for transmitting power at a second power level based on a ratio of a current level of the wireless power receiver to a current level of a wireless power transmitter at the first power level. The method further includes during a second time period, transmitting power at the second power level and at the frequency, the first power level lower than the second power level.

BRIEF DESCRIPTION OF THE DRAWINGS

The above-mentioned aspects, as well as other features, aspects, and advantages of the present technology will now be described in connection with various embodiments, with reference to the accompanying drawings. The illustrated embodiments, however, are merely examples and are not intended to be limiting. Throughout the drawings, similar symbols typically identify similar components, unless context dictates otherwise. Note that the relative dimensions of the following figures may not be drawn to scale.

DETAILED DESCRIPTION

In the following detailed description, reference is made to the accompanying drawings, which form a part of the present disclosure. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and form part of this disclosure.

Wireless power transfer may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field or an electromagnetic field) may be received, captured by, or coupled by a "receive antenna" to achieve power transfer.

The terminology used herein is for the purpose of describing particular embodiments only and is not intended to be limiting of the disclosure. It will be understood by those within the art that if a specific number of a claim element is intended, such intent will be explicitly recited in the claim, and in the absence of such recitation, no such intent is present. For example, as used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and "including," when used in this specification, specify the presence of stated features, integers, steps, operations, elements, and/or components, but do not preclude the presence or addition of one or more other features, integers, steps, operations, elements, components, and/or groups thereof. Expressions such as "at least one of," when preceding a list of elements, modify the entire list of elements and do not modify the individual elements of the list.

Figure 1:
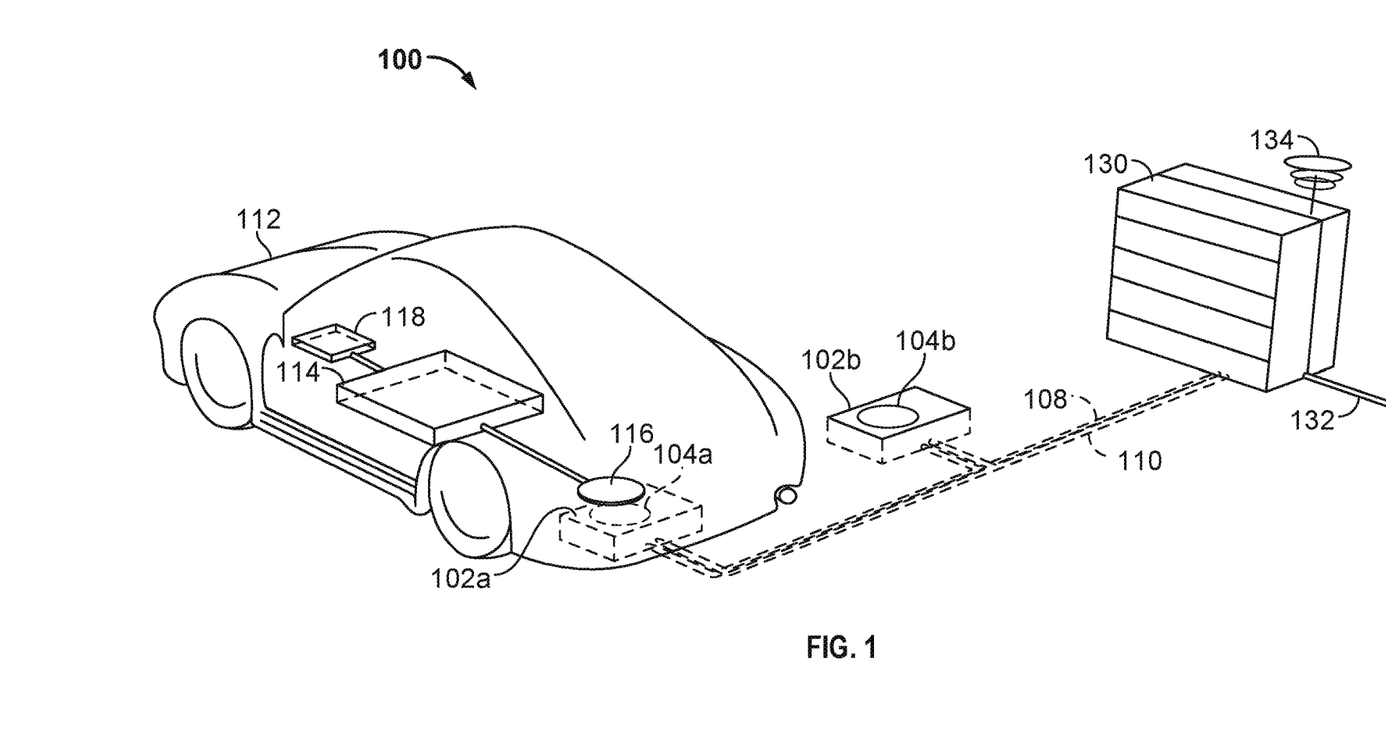
FIG. 1 is a functional block diagram of a wireless power transfer system, in accordance with one example of an implementation.

FIG. 1 is a diagram of a wireless power transfer system 100 for charging an electric vehicle 112, in accordance with some implementations. The wireless power transfer system 100 enables charging of an electric vehicle 112 while the electric vehicle 112 is parked near a base wireless charging system 102a. Spaces for two electric vehicles are illustrated in a parking area to be parked over corresponding base wireless charging system 102a and 102b. In some implementations, a local distribution center 190 may be connected to a power backbone 132 and configured to provide an alternating current (AC) or a direct current (DC) supply through a power link 110 to the base wireless charging system 102a. The base wireless charging system 102a also includes a base system induction coil 104a for wirelessly transferring or receiving power. An electric vehicle 112 may include a battery unit 118, an electric vehicle induction coil 116, and an electric vehicle wireless charging system 114. The electric vehicle induction coil 116 may interact with the base system induction coil 104a for example, via a region of the magnetic field generated by the base system induction coil 104a.

In some implementations, the electric vehicle induction coil 116 may receive power when the electric vehicle induction coil 116 is located in an energy field produced by the base system induction coil 104a. The field corresponds to a region where energy output by the base system induction coil 104a may be captured by an electric vehicle induction coil 116. For example, the energy output by the base system induction coil 104a may be at a level sufficient to charge or power the electric vehicle 112. In some cases, the field may correspond to the "near field" of the base system induction coil 104a. The near-field may correspond to a region in which there are strong reactive fields resulting from the currents and charges in the base system induction coil 104a that do not radiate power away from the base system induction coil 104a. In some cases the near-field may correspond to a region that is within about $\frac{1}{2}\pi$ of wavelength of the base system induction coil 104a (and vice versa for the electric vehicle induction coil 116) as will be further described below.

Local distribution 130 may be configured to communicate with external sources (e.g., a power grid) via a communication backhaul 134, and with the base wireless charging system 102a via a communication link 108.

In some implementations the electric vehicle induction coil 116 may be aligned with the base system induction coil 104a and, therefore, disposed within a near-field region simply by the driver positioning the electric vehicle 112 correctly relative to the base system induction coil 104a. In other implementations, the driver may be given visual feedback, auditory feedback, or combinations thereof to determine when the electric vehicle 112 is properly placed for wireless power transfer. In yet other implementations, the electric vehicle 112 may be positioned by an autopilot system, which may move the electric vehicle 112 back and forth (e.g., in zig-zag movements) until an alignment error has reached a tolerable value. This may be performed automatically and autonomously by the electric vehicle 112 without or with only minimal driver intervention provided that the electric vehicle 112 is equipped with a servo steering wheel, ultrasonic sensors, and intelligence to adjust the vehicle. In still other implementations, the electric vehicle induction coil 116, the base system induction coil 104a, or a combination thereof may have functionality for displacing and moving the induction coils 116 and 104a relative to each other to more accurately orient them and develop more efficient coupling therebetween.

The base wireless charging system 102a may be located in a variety of locations. As non-limiting examples, some suitable locations include a parking area at a home of the electric vehicle 112 owner, parking areas reserved for electric vehicle wireless charging modeled after conventional petroleum-based filling stations, and parking lots at other locations such as shopping centers and places of employment.

Charging electric vehicles wirelessly may provide numerous benefits. For example, charging may be performed automatically, virtually without driver intervention and manipulations thereby improving convenience to a user. There may also be no exposed electrical contacts and no mechanical wear out, thereby improving reliability of the wireless power transfer system 100. Manipulations with cables and connectors may not be needed, and there may be no cables, plugs, or sockets that may be exposed to moisture and water in an outdoor environment, thereby improving safety. There may also be no sockets, cables, and plugs visible or accessible, thereby reducing potential vandalism of power charging devices. Further, since an electric vehicle 112 may be used as distributed storage devices to stabilize a power grid, a docking-to-grid solution may be used to increase availability of vehicles for Vehicle-to-Grid (V2G) operation.

A wireless power transfer system 100 as described with reference to FIG. 1 may also provide aesthetical and non-impedimental advantages. For example, there may be no charge columns and cables that may be impedimental for vehicles and/or pedestrians.

As a further explanation of the vehicle-to-grid capability, the wireless power transmit and receive capabilities may be configured to be reciprocal such that the base wireless charging system 102a transfers power to the electric vehicle 112 and the electric vehicle 112 transfers power to the base wireless charging system 102a e.g., in times of energy shortfall. This capability may be useful to stabilize the power distribution grid by allowing electric vehicles to contribute power to the overall distribution system in times of energy shortfall caused by over demand or shortfall in renewable energy production (e.g., wind or solar).

Figure 2:
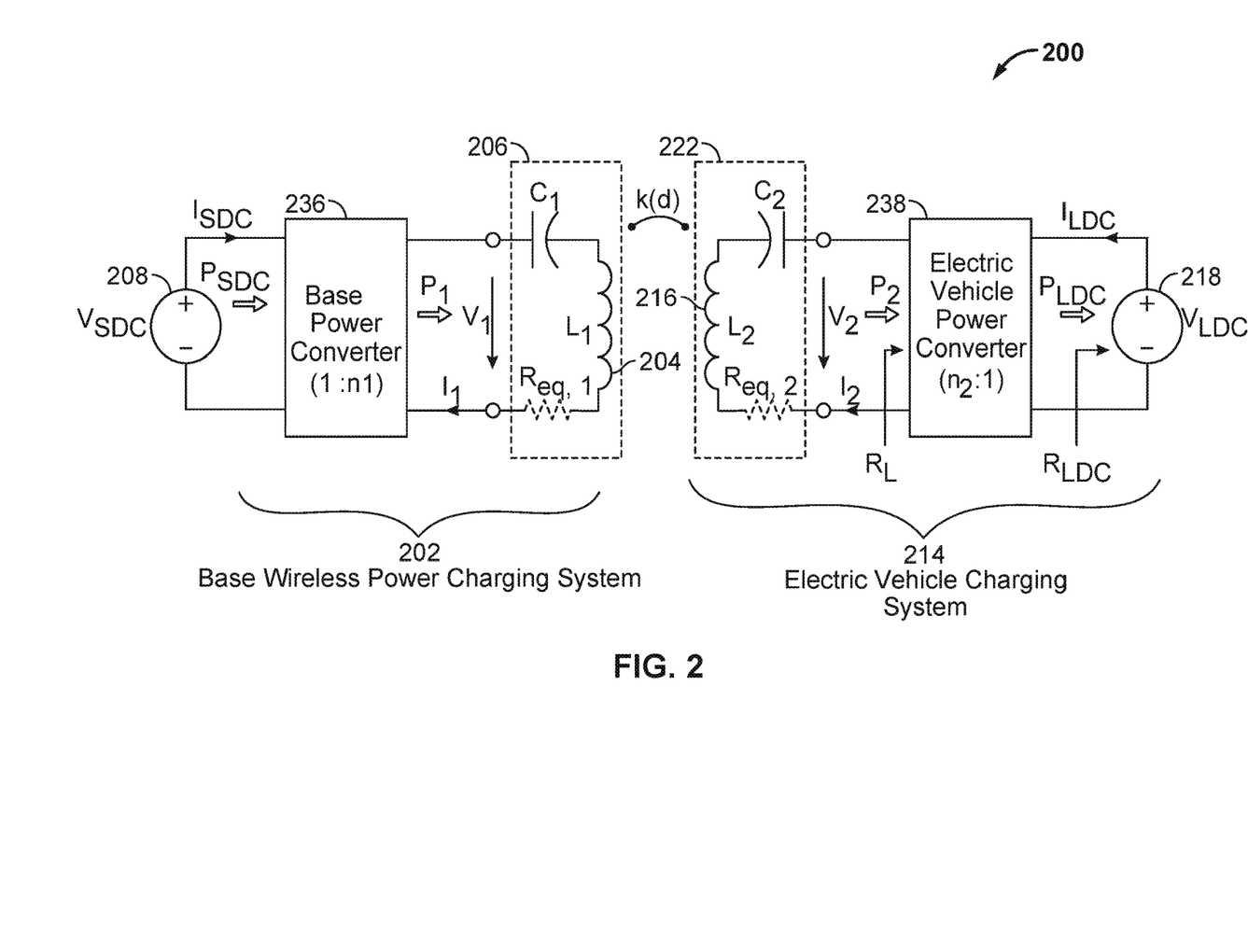
FIG. 2 is a functional block diagram of a wireless power transfer system, in accordance with another example implementation.

FIG. 2 is a schematic diagram of core components of the wireless power transfer system 100 of FIG. 1. As shown in FIG. 2, the wireless power transfer system 200 may include a base system transmit circuit 206 including a base system induction coil 204 having an inductance $L_1$. The wireless power transfer system 200 further includes an electric vehicle receive circuit 222 including an electric vehicle induction coil 216 having an inductance $L_2$. Implementations described herein may use capacitively loaded wire loops (i.e., multi-turn coils) forming a resonant structure that is capable of efficiently coupling energy from a primary structure (transmitter) to a secondary structure (receiver) via a magnetic or electromagnetic near field if both primary and secondary are tuned to a common resonant frequency. The coils may be used for the electric vehicle induction coil 216 and the base system induction coil 204. Using resonant structures for coupling energy may be referred to "magnetic coupled resonance," "electromagnetic coupled resonance," and/or "resonant induction." The operation of the wireless power transfer system 200 will be described based on power transfer from a base wireless power charging system 202 to an electric vehicle 112, but is not limited thereto. For example, as discussed above, the electric vehicle 112 may transfer power to the base wireless charging system 102a.

With reference to FIG. 2, a power supply 208 (e.g., AC or DC) supplies power $P_{SDC}$ to the base wireless power charging system 202 to transfer energy to an electric vehicle 112. The base wireless power charging system 202 includes a base charging system power converter 336. The base charging system power converter 236 may include circuitry such as an AC/DC converter configured to convert power from standard mains AC to DC power at a suitable voltage level, and a DC/low frequency (LF) converter configured to convert DC power to power at an operating frequency suitable for wireless high power transfer. The base charging system power converter 236 supplies power $P_1$ to the base system transmit circuit 206 including the capacitor $C_1$ in series with the base system induction coil 204 to emit a magnetic field at a desired frequency. The capacitor $C_1$ may be coupled with the base system induction coil 204 either in parallel or in series, or may be formed of several reactive elements in any combination of parallel or series topology. The capacitor $C_1$ may be provided to form a resonant circuit with the base system induction coil 204 that resonates at a desired frequency. The base system induction coil 204 receives the power $P_1$ and wirelessly transmits power at a level sufficient to charge or power the electric vehicle 112. For example, the power level provided wirelessly by the base system induction coil 204 may be on the order of kilowatts (kW) (e.g., anywhere from 1 kW to 110 kW or higher or lower) and, in some implementations, may be transferred at frequencies including but not limited to 85 kHz.

The base system transmit circuit 206 including the base system induction coil 204 and electric vehicle receive circuit 222 including the electric vehicle induction coil 216 may be tuned to substantially the same frequencies and may be positioned within the near-field of a magnetic field transmitted by one of the base system induction coil 204 and the electric vehicle induction coil 116. In this case, the base system induction coil 204 and electric vehicle induction coil 116 may become coupled to one another such that power may be transferred to the electric vehicle receive circuit 222 including capacitor $C_2$ and electric vehicle induction coil 116. The capacitor $C_2$ may be provided to form a resonant circuit with the electric vehicle induction coil 216 that resonates at a desired frequency. The capacitor $C_2$ may be coupled with the electric vehicle induction coil 204 either in parallel or in series, or may be formed of several reactive elements in any combination of parallel or series topology. Element k(d) represents the mutual coupling coefficient resulting at coil separation. Equivalent resistances $R_{eq,1}$ and $R_{eq,2}$ represent the losses that may be inherent to the induction coils 204 and 216 and the anti-reactance capacitors $C_1$ and $C_2$. The electric vehicle receive circuit 222 including the electric vehicle induction coil 216 and capacitor $C_2$ receives power $P_2$ and provides the power $P_2$ to an electric vehicle power converter 238 of an electric vehicle charging system 214.

The electric vehicle power converter 238 may include, among other things, a LF/DC converter configured to convert power at an operating frequency back to DC power at a voltage level matched to the voltage level of an electric vehicle battery unit 218. The electric vehicle power converter 238 may provide the converted power $P_{LDC}$ to charge the electric vehicle battery unit 218. The power supply 208, base charging system power converter 236, and base system induction coil 204 may be stationary and located at a variety of locations as discussed above. The battery unit 218, electric vehicle power converter 238, and electric vehicle induction coil 216 may be included in an electric vehicle charging system 214 that is part of electric vehicle 112 or part of the battery pack (not shown). The electric vehicle charging system 214 may also be configured to provide power wirelessly through the electric vehicle induction coil 216 to the base wireless power charging system 202 to feed power back to the grid. Each of the electric vehicle induction coil 216 and the base system induction coil 204 may act as transmit or receive induction coils based on the mode of operation.

While not shown, the wireless power transfer system 200 may include a load disconnect unit (LDU) to safely disconnect the electric vehicle battery unit 218 or the power supply 208 from the wireless power transfer system 200. For example, in case of an emergency or system failure, the LDU may be triggered to disconnect the load from the wireless power transfer system 200. The LDU may be provided in addition to a battery management system for managing charging to a battery, or it may be part of the battery management system.

Further, the electric vehicle charging system 214 may include switching circuitry (not shown) for selectively connecting and disconnecting the electric vehicle induction coil 216 to the electric vehicle power converter 238. Disconnecting the electric vehicle induction coil 216 may suspend charging and also may adjust the "load" as "seen" by the base wireless charging system 102a (acting as a transmitter), which may be used to "cloak" the electric vehicle charging system 114 (acting as the receiver) from the base wireless charging system 102a. The load changes may be detected if the transmitter includes the load sensing circuit. Accordingly, the transmitter, such as a base wireless charging system 202, may have a mechanism for determining when receivers, such as an electric vehicle charging system 114, are present in the near-field of the base system induction coil 204.

As described above, in operation, assuming energy transfer towards the vehicle or battery, input power is provided from the power supply 208 such that the base system induction coil 204 generates a field for providing the energy transfer. The electric vehicle induction coil 216 couples to the radiated field and generates output power for storage or consumption by the electric vehicle 112. As described above, in some implementations, the base system induction coil 204 and electric vehicle induction coil 116 are configured according to a mutual resonant relationship such that when the resonant frequency of the electric vehicle induction coil 116 and the resonant frequency of the base system induction coil 204 are very close or substantially the same. Transmission losses between the base wireless power charging system 202 and electric vehicle charging system 214 are minimal when the electric vehicle induction coil 216 is located in the near-field of the base system induction coil 204.

As stated, an efficient energy transfer occurs by coupling a large portion of the energy in the near field of a transmitting induction coil to a receiving induction coil rather than propagating most of the energy in a magnetic wave to the far-field. When in the near field, a coupling mode may be established between the transmit induction coil and the receive induction coil. The area around the induction coils where this near field coupling may occur is referred to herein as a near field coupling mode region.

While not shown, the base charging system power converter 236 and the electric vehicle power converter 238 may both include an oscillator, a driver circuit such as a power amplifier, a filter, and a matching circuit for efficient coupling with the wireless power induction coil. The oscillator may be configured to generate a desired frequency, which may be adjusted in response to an adjustment signal. The oscillator signal may be amplified by a power amplifier with an amplification amount responsive to control signals. The filter and matching circuit may be included to filter out harmonics or other unwanted frequencies and match the impedance of the power conversion module to the wireless power induction coil. The power converters 236 and 238 may also include a rectifier and switching circuitry to generate a suitable power output to charge the battery.

The electric vehicle induction coil 216 and base system induction coil 204 as described throughout the disclosed implementations may be referred to or configured as "loop" antennas, and more specifically, multi-turn loop antennas. The induction coils 204 and 216 may also be referred to herein or be configured as "magnetic" antennas. The term "coils" is intended to refer to a component that may wirelessly output or receive energy four coupling to another "coil." The coil may also be referred to as an "antenna" of a type that is configured to wirelessly output or receive power. As used herein, coils 204 and 216 are examples of "power transfer components" of a type that are configured to wirelessly output, wirelessly receive, and/or wirelessly relay power. Loop (e.g., multi-turn loop) antennas may be configured to include an air core or a physical core such as a ferrite core. An air core loop antenna may allow the placement of other components within the core area. Physical core antennas including ferromagnetic or ferromagnetic materials may allow development of a stronger magnetic field and improved coupling.

As discussed above, efficient transfer of energy between a transmitter and receiver occurs during matched or nearly matched resonance between a transmitter and a receiver. However, even when resonance between a transmitter and receiver are not matched, energy may be transferred at a lower efficiency. Transfer of energy occurs by coupling energy from the near field of the transmitting induction coil to the receiving induction coil residing within a region (e.g., within a predetermined frequency range of the resonant frequency, or within a predetermined distance of the near-field region) where this near field is established rather than propagating the energy from the transmitting induction coil into free space.

A resonant frequency may be based on the inductance and capacitance of a transmit circuit including an induction coil (e.g., the base system induction coil 204) as described above. As shown in FIG. 2, inductance may generally be the inductance of the induction coil, whereas, capacitance may be added to the induction coil to create a resonant structure at a desired resonant frequency. As a non-limiting example, as shown in FIG. 2, a capacitor may be added in series with the induction coil to create a resonant circuit (e.g., the base system transmit circuit 206) that generates a magnetic field. Accordingly, for larger diameter induction coils, the value of capacitance needed to induce resonance may decrease as the diameter or inductance of the coil increases. Inductance may also depend on a number of turns of an induction coil. Furthermore, as the diameter of the induction coil increases, the efficient energy transfer area of the near field may increase. Other resonant circuits are possible. As another non limiting example, a capacitor may be placed in parallel between the two terminals of the induction coil (e.g., a parallel resonant circuit). Furthermore an induction coil may be designed to have a high quality (Q) factor to improve the resonance of the induction coil. For example, the Q factor may be 300 or greater.

As described above, according to some implementations, coupling power between two induction coils that are in the near field of one another is disclosed. As described above, the near field may correspond to a region around the induction coil in which magnetic fields exist but may not propagate or radiate away from the induction coil. Near-field coupling-mode regions may correspond to a volume that is near the physical volume of the induction coil, typically within a small fraction of the wavelength. According to some implementations, magnetic induction coils, such as single and multi-turn loop antennas, are used for both transmitting and receiving since magnetic near field amplitudes in practical implementations tend to be higher for magnetic type coils in comparison to the electric near fields of an electric type antenna (e.g., a small dipole). This allows for potentially higher coupling between the pair. Furthermore, "electric" antennas (e.g., dipoles and monopoles) or a combination of magnetic and electric antennas may be used.

Figure 3:
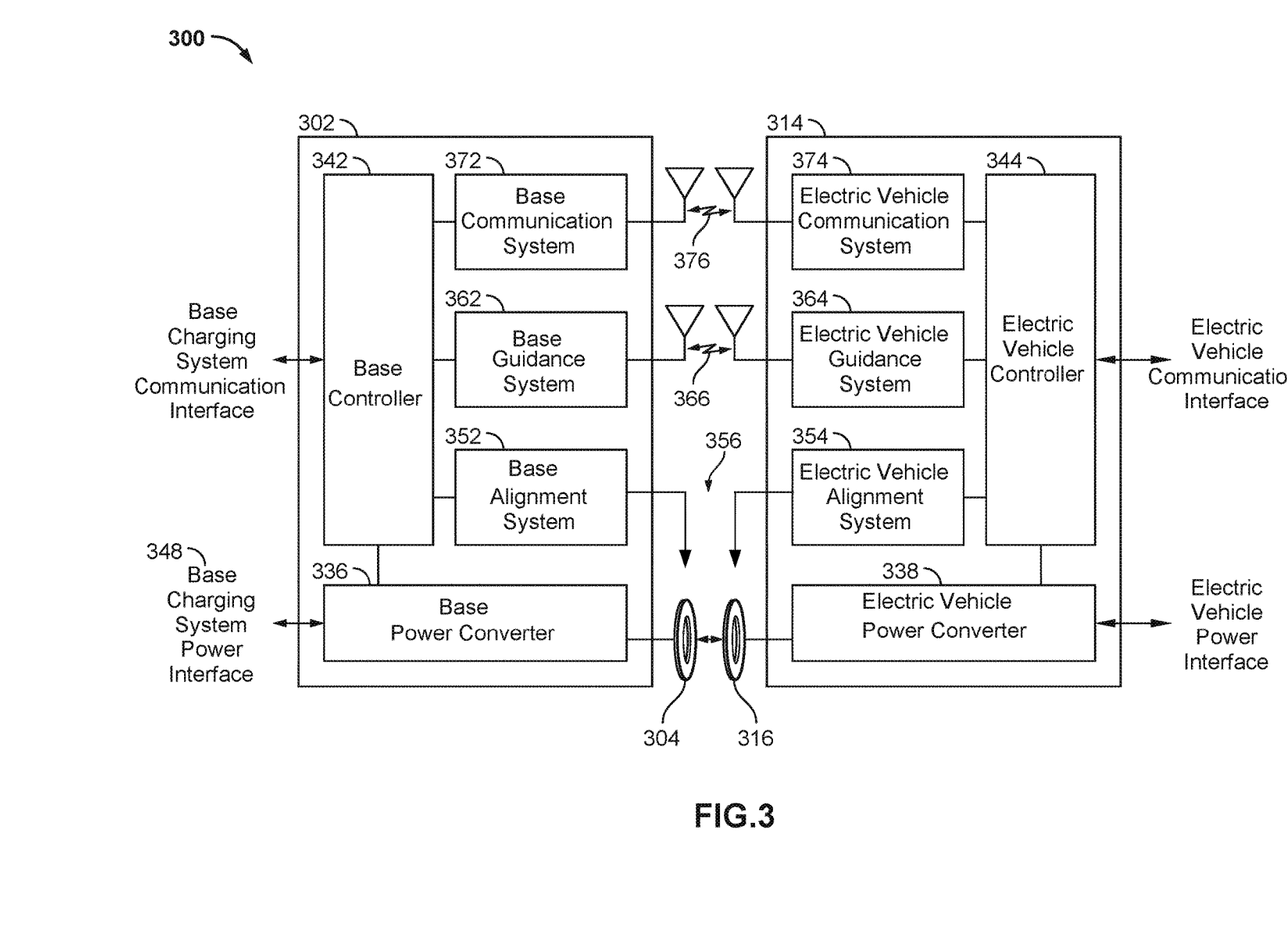
FIG. 3 is a functional block diagram of a wireless power transfer system, in accordance with another example implementation.

FIG. 3 is another functional block diagram showing core and ancillary components of the wireless power transfer system 300 of FIG. 1. The wireless power transfer system 300 illustrates a communication link 376, a guidance link 366, and alignment systems 352, 354 including an alignment mechanism 356 capable of moving one or both of the base system induction coil 304 and electric vehicle induction coil 316. As described above with reference to FIG. 2, and assuming energy flow towards the electric vehicle 112, in FIG. 3 a base charging system power interface 348 may be configured to provide power to a charging system power converter 336 from a power source, such as an AC or DC power supply 186. The base charging system power converter 336 may receive AC or DC power from the base charging system power interface 348 to excite the base system induction coil 304 at or near its resonant frequency. The electric vehicle induction coil 316, when in the near field coupling-mode region, may receive energy from the near field coupling mode region to oscillate at or near the resonant frequency. The electric vehicle power converter 338 converts the oscillating signal from the electric vehicle induction coil 316 to a power signal suitable for charging a battery via the electric vehicle power interface.

The base wireless charging system 302 includes a base charging system controller 342 and the electric vehicle charging system 234 includes an electric vehicle controller 344. The base charging system controller 342 may include a base charging system communication interface 212 to other systems (not shown) such as, for example, a computer, and a power distribution center, or a smart power grid. The electric vehicle controller 344 may include an electric vehicle communication interface to other systems (not shown) such as, for example, an on-board computer on the vehicle, other battery charging controller, other electronic systems within the vehicles, and remote electronic systems.

The base charging system controller 342 and electric vehicle controller 344 may include subsystems or modules for specific application with separate communication channels. These communications channels may be separate physical channels or separate logical channels. In addition, there may be separate general-purpose communication links (e.g., channels) supported by base charging communication system 372 and electric vehicle communication system 374 for communicating other information between the base wireless power charging system 302 and the electric vehicle charging system 234. This information may include information about electric vehicle characteristics, battery characteristics, charging status, and power capabilities of both the base wireless power charging system 302 and the electric vehicle charging system 234, as well as maintenance and diagnostic data for the electric vehicle 112. These communication channels may be separate physical communication channels such as, for example, Bluetooth, zigbee, cellular, etc.

Electric vehicle controller 344 may also include a battery management system (BMS) (not shown) that manages charge and discharge of the electric vehicle principal battery, a parking assistance system based on microwave or ultrasonic radar principles, a brake system configured to perform a semi-automatic parking operation, and a steering wheel servo system configured to assist with a largely automated parking 'park by wire' that may provide higher parking accuracy, thus reducing the need for mechanical horizontal induction coil alignment in any of the base wireless charging system 102a and the electric vehicle charging system 114. Further, electric vehicle controller 344 may be configured to communicate with electronics of the electric vehicle 112. For example, electric vehicle controller 344 may be configured to communicate with visual output devices (e.g., a dashboard display), acoustic/audio output devices (e.g., buzzer, speakers), mechanical input devices (e.g., keyboard, touch screen, and pointing devices such as joystick, trackball, etc.), and audio input devices (e.g., microphone with electronic voice recognition).

Furthermore, the wireless power transfer system 300 may include detection and sensor systems. For example, the wireless power transfer system 300 may include sensors for use with systems to properly guide the driver or the vehicle to the charging spot, sensors to mutually align the induction coils with the required separation/coupling, sensors to detect objects that may obstruct the electric vehicle induction coil 316 from moving to a particular height and/or position to achieve coupling, and safety sensors for use with systems to perform a reliable, damage free, and safe operation of the system. For example, a safety sensor may include a sensor for detection of presence of animals or children approaching the wireless power induction coils 104a, 116 beyond a safety radius, detection of metal objects near the base system induction coil 304 that may be heated up (induction heating), detection of hazardous events such as incandescent objects on the base system induction coil 304, and temperature monitoring of the base wireless power charging system 302 and electric vehicle charging system 214 components.

The wireless power transfer system 300 may also support plug-in charging via a wired connection. A wired charge port may integrate the outputs of the two different chargers prior to transferring power to or from the electric vehicle 112. Switching circuits may provide the functionality as needed to support both wireless charging and charging via a wired charge port.

To communicate between a base wireless charging system 302 and an electric vehicle charging system 314, the wireless power transfer system 300 may use both in-band signaling and an RF data modem (e.g., Ethernet over radio in an unlicensed band). The out-of-band communication may provide sufficient bandwidth for the allocation of value-add services to the vehicle user/owner. A low depth amplitude or phase modulation of the wireless power carrier may serve as an in-band signaling system with minimal interference.

In addition, some communication may be performed via the wireless power link without using specific communications antennas. For example, the wireless power induction coils 304 and 316 may also be configured to act as wireless communication transmitters. Thus, some implementations of the base wireless power charging system 302 may include a controller (not shown) for enabling keying type protocol on the wireless power path. By keying the transmit power level (amplitude shift keying) at predefined intervals with a predefined protocol, the receiver may detect a serial communication from the transmitter. The base charging system power converter 336 may include a load sensing circuit (not shown) for detecting the presence or absence of active electric vehicle receivers in the vicinity of the near field generated by the base system induction coil 304. By way of example, a load sensing circuit monitors the current flowing to the power amplifier, which is affected by the presence or absence of active receivers in the vicinity of the near field generated by base system induction coil 104a. Detection of changes to the loading on the power amplifier may be monitored by the base charging system controller 342 for use in determining whether to enable the oscillator for transmitting energy, to communicate with an active receiver, or a combination thereof.

During wireless power transfer, an ideal or preferred operation frequency of a wireless power transfer system (e.g., wireless power transfer system 100-300 of FIGS. 1-3) may be dependent on many non-constant parameters. For example, inductances of base pads and/or vehicle pads (e.g., base system induction coil 304 and/or electric vehicle induction coil 316) may change values based on different alignment positions between the coils. Additionally, magnetic coupling values may change with different alignment positions of the coils and may result in different coil (resonant) currents. In another example, the base and/or vehicle pads may comprise tuning capacitors whose values may change due to aging. Further, a voltage of a battery of the electric vehicle (e.g., electric vehicle battery unit 218) may change during charging and may also affect the operation frequency. In some aspects, at higher power classes (e.g., 11/22 kW) the variations in these non-constant parameters may worsen due to larger pads/coils. In some embodiments, varying the system frequency in real time while charging may be complex, may not guarantee finding an ideal operation point, and may create other issues like bifurcation. In other aspects, it may be possible to operate at fixed frequency and use higher rated components to handle the additional reactive power in the system, however, the system may operate at a lower efficiency than if were to operate at the ideal operation frequency. In some aspects, performing a frequency sweep at the transmitter/primary-side as pre-charging during the alignment check doesn't take the secondary side into account and therefore may not be suitable to find the ideal operation frequency. Additionally, using a passive secondary side and charging with a constant low power doesn't work as well since the pad currents will be different at normal power charging levels. Embodiments described herein relate to methods and apparatus for identifying an ideal operation frequency which accounts for these non-constant parameters.

Figure 4:
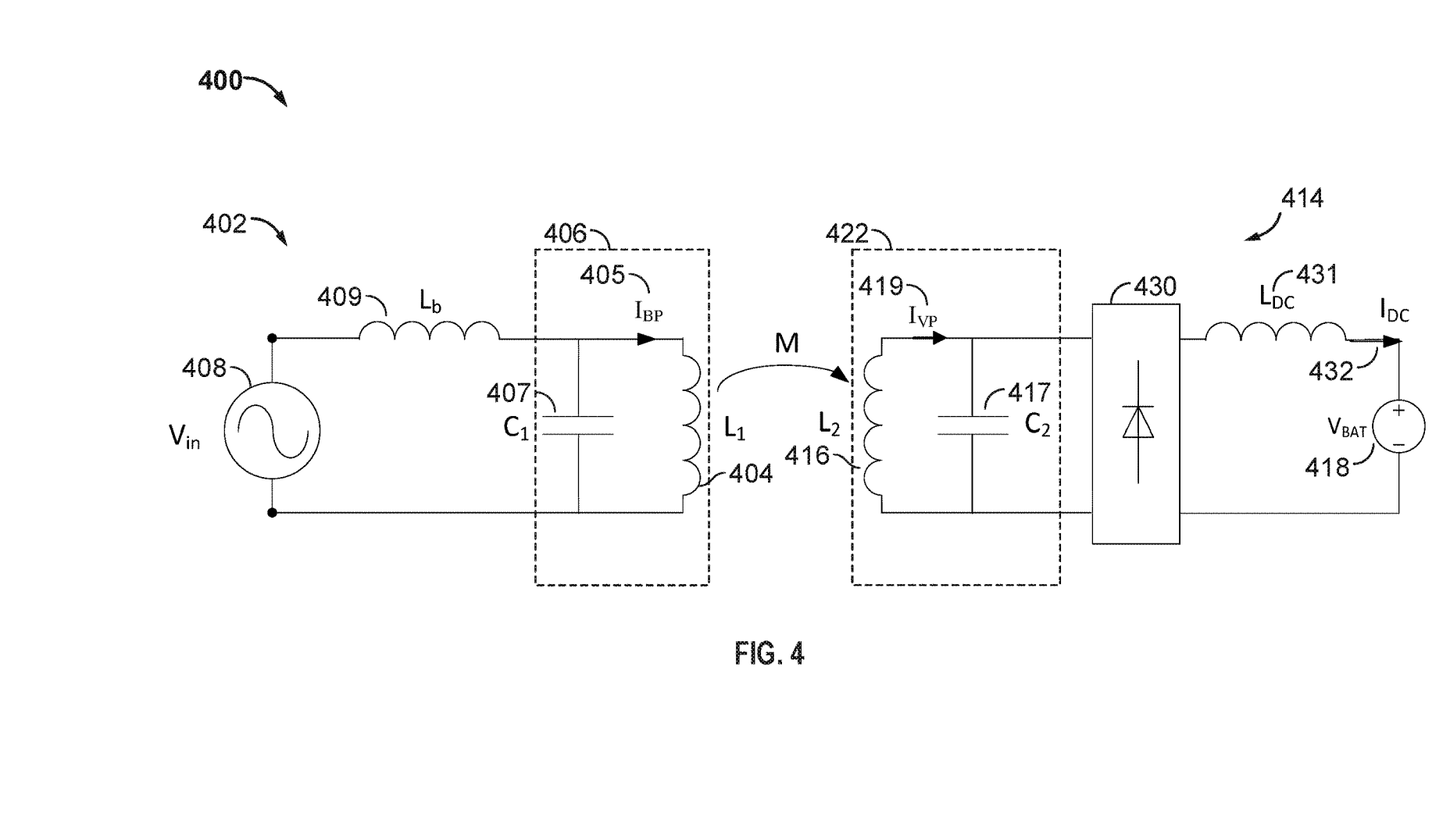
FIG. 4 is a diagram of a wireless power transfer system comprising an adjustable voltage input and an active tuning circuit, in accordance with another example implementation.

FIG. 4 is a diagram of a wireless power transfer system 400 comprising a base pad 402 and a vehicle pad 414 in accordance with an embodiment. In some aspects, the base pad 402 may also be referred to wireless power transmitter and may comprise similar components and perform similar functions as the base wireless power charging systems 102, 202, and 302 of FIGS. 1-3. In some embodiments, the vehicle pad 414 may also be referred to as a wireless power receiver and may comprise similar components and perform similar functions as the electric vehicle charging systems 114, 214, and 314 of FIGS. 1-3. As shown, the base pad 402 comprises input voltage source $V_{in}$ 408, a base inductance $L_b$ 409, and a base transmit circuit 406 comprising a base pad induction coil $L_1$ 404 having a base pad current $I_{BP}$ 405 and a capacitor $C_1$ 407. In some aspects, the input voltage source $V_{in}$ 408 comprises an adjustable input voltage source. For example, the input voltage source $V_{in}$ 408 may comprise an inverter and a power factor correction (PFC) unit to adjust a voltage level of the input voltage source $V_{in}$ 408.

The vehicle pad 414 comprises a vehicle receive circuit 422 which comprises a vehicle pad induction coil $L_2$ 416 and a capacitor $C_2$ 417. The vehicle receiver circuit 422 receives wireless power from the base transmit circuit 406 via a magnetic field. The magnetic field generates a vehicle pad current $I_{VP}$ 419 in the vehicle pad induction coil $L_2$ 416. The vehicle pad 414 also comprises an activing tuning unit 430, a DC inductance $L_{DC}$ 431, and a vehicle battery voltage 418 having an output current $I_{DC}$ 432. In some embodiments, the vehicle pad current $I_{DC}$ 419 is rectified by a rectifier (not shown) and converted to the output current $I_{DC}$ 432. In some aspects, the active tuning circuit 430 may be configured to tune the vehicle receive circuit 422 so as to adjust the current received or other parameter to maintain an ideal operation frequency. In some embodiments, the active tuning circuit 430 may comprise a current doubler circuit.

In some embodiments, it may be beneficial for the wireless power transfer system 400 to perform an initial charging routine at a first power level where every charging parameter is similar/ratiometric to a second power level, where the first power level is lower than the second power level. In some embodiments, the first power level may be a low power level and the second power level may be a full charging power level used during normal charging of the vehicle battery voltage 418. In some aspects, the first power level may be equal to the second power level. For example, the vehicle battery may be at or near a full charge and the second power level may then be a lower power level that is near or equal to the first power level. The initial charging routine may offer several benefits over other methods wireless power transfer. For example, in some aspects, no real time frequency adjustment may be necessary which results in stable operation and no bifurcation. In some aspects, the charging system may be able to find an ideal system frequency for normal power level charging at low power level resulting in less power consumed in finding the ideal system frequency. In some embodiments, the ideal system frequency stays substantially constant over entire charging cycle due to a constant base pad current ratio. Another advantage may be that no additional hardware or sense signals are needed. Also, finding the ideal system frequency using the initial charging routine may ensure that the wireless power transfer system 400 reduces the base pad currents to the necessary minimum for each single alignment point with the vehicle pad.

The initial charging routine occurs after an alignment procedure because after the alignment procedure is done coupling, inductances and capacitance values remain substantially constant. During operation, the ideal operation frequency changes only with a different pad current ratio (e.g., base pad current to vehicle pad current, $I_{BP}$ 405/$I_{VP}$ 419) not with different absolute current values, so the initial charging routine runs with the same ratio that will occur at a normal charging power level. In some aspects, the pad current ratio gets defined by maximum currents of the base pad 402 (e.g., base pad induction coil $L_1$ 404 having current $I_1$ 405) and the vehicle pad 414 (e.g., vehicle pad induction coil $L_2$ 416 generating vehicle pad current $I_{VP}$ 419) and may be referred as a required ratio. In some embodiments, the maximum currents of the base pad 402 and vehicle pad 414 may be defined by the manufacturer of the base pads 402 and 414, based on emission standard requirements, heat generated in the pads, or may defined by some other factor. If the coupling is larger both currents reduce while pad current ratio stays constant. In some aspects, the vehicle battery voltage 418 changes during the charging. If the secondary side is not compensating that the pad current ratio changes during charging and the ideal operation frequency drifts away. As described above, the active tuning circuit 430 may be configured to tune the vehicle receive circuit 422 so as to adjust the current received or other parameter to maintain an ideal operation frequency and constant pad current ratio.

Figure 5:
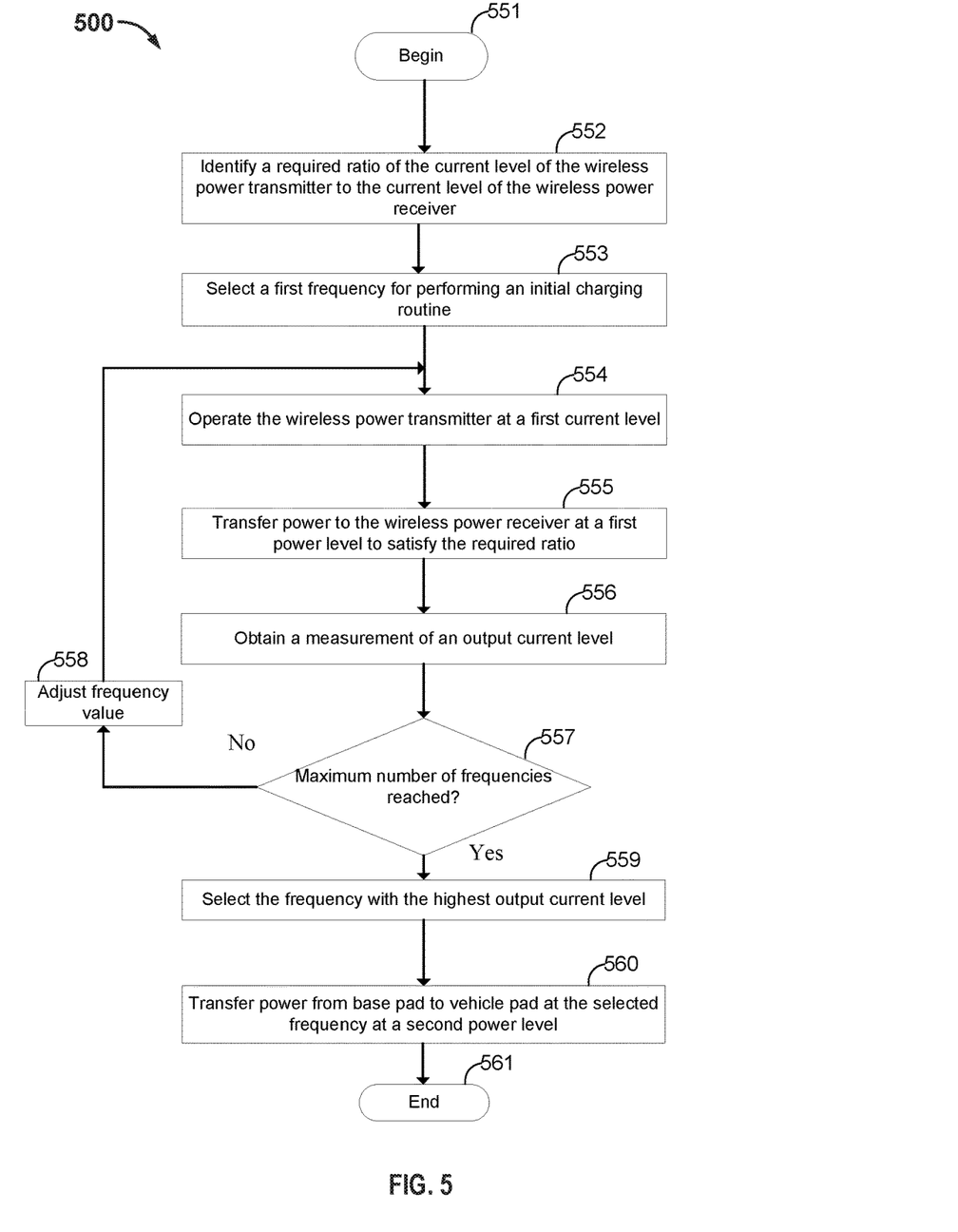
FIG. 5 is a flowchart of an exemplary method of an initial charging routine for finding an ideal operating frequency at a first or low power level, in accordance with another example implementation.

FIG. 5 is a flowchart depicting a method 500 for determining an ideal operating frequency. The method shown in FIG. 5 may be implemented via one or more devices in the wireless power transfer systems 100-400 similar to the base wireless power charging system 102, 202, 302, and the base pad 402 of FIGS. 1-4. Although the method 500 is described herein with reference to a particular order, in various implementations, blocks herein may be performed in a different order, or omitted, and additional blocks may be added.

The method 500 begins at block 551 after the base pad 402 has completed an alignment process with the vehicle pad 414. At block 552 the base pad 402 identifies a required ratio of a current level of the wireless power transmitter to a current level of the wireless power receiver. In some aspects, the required ratio may be a predefined value stored in the base controller 342 or may be communicate between the base communication system 372 and the electric vehicle communication system 374 over the communication link 376. At block 553, the base pad 402 may select a first frequency (e.g., 90 kHz) for performing an initial charging routine for finding an ideal operating frequency. In some aspects, the base controller 342 may identify the first frequency from a predetermined value or may calculate an appropriate first frequency value based at least in part on the type, configuration, size, or other parameter or characteristic of the base pad 402 and/or vehicle pad 414.

At block 554, the base controller 342 may operate the base pad 402 at a first current level to provide power at a first power level. In some aspects, the first current level may be a fraction of the maximum base pad current $I_{BP}$ 405 (e.g., ⅓ or ¼ of $I_{BP\_max}$). In some embodiments, the vehicle pad 414 may clamp the receive circuit 422 during block 554 so that no current (e.g., $I_{DC}$ 432) flows in the vehicle pad 414 (e.g., similar to the alignment procedure between the base pad 402 and vehicle pad 414). At block 555, the base pad 402 transfers power at the first power level via the base transmit circuit 406 to the vehicle pad 414 so as to satisfy the required ratio. In some aspects, in order to satisfy the required ratio the vehicle pad 414 may start to unclamp and receive power via the vehicle pad induction coil $L_2$ 416. In some aspects, the active tuning circuit 430 may control the vehicle pad current $I_{VP}$ 419 to a constant value based on the required ratio (e.g., $I_{VP}$ 419=ratio*$I_{BP}$ 405). Once both the vehicle pad current $I_{VP}$ 419 and the base pad current $I_{BP}$ 405 values are constant and at the required ratio, at block 556, the base pad 402 obtains a measurement of the output current $I_{DC}$ 432 and stores that measured output current $I_{DC}$ 432 value. In some aspects, the vehicle pad 414 measures the output current $I_{DC}$ 432 and transmits the measurement to the base pad 402.

At block 557, the base pad 402 determines whether a maximum number of frequencies used in the initial charging routine has been reached. If not, then at block 558, the base pad 402 adjusts the first frequency to a second frequency value and returns to block 554 to perform blocks 554, 555, 556 at the second frequency. In some aspects, the first frequency may be 90 kHz and the base pad 402 may adjust the first frequency and perform steps blocks 554, 555, 556 until a frequency of 81.3 kHz is reached, however, other frequency ranges and values are possible. In some aspects, the maximum number of frequencies used as part of the initial charging routine may predetermined by the manufacturers of the base pad 402 and/or vehicle pad 414 or may be communicated between the base pad 402 and the vehicle pad 414. If the maximum number of frequencies has been reached, then at block 559, the base controller 342 may select the frequency that had the highest measured output current $I_{DC}$ 432 obtained in block 556 for each of the frequencies checked. At block 560, the base pad 402 may transfer power to the vehicle pad 414 at the selected frequency at a second power level, the second power level being higher than the first power level. In some aspects, the second power level is a power level used during normal charging of the electric vehicle 112. At block 561, the method ends.

Figure 6:
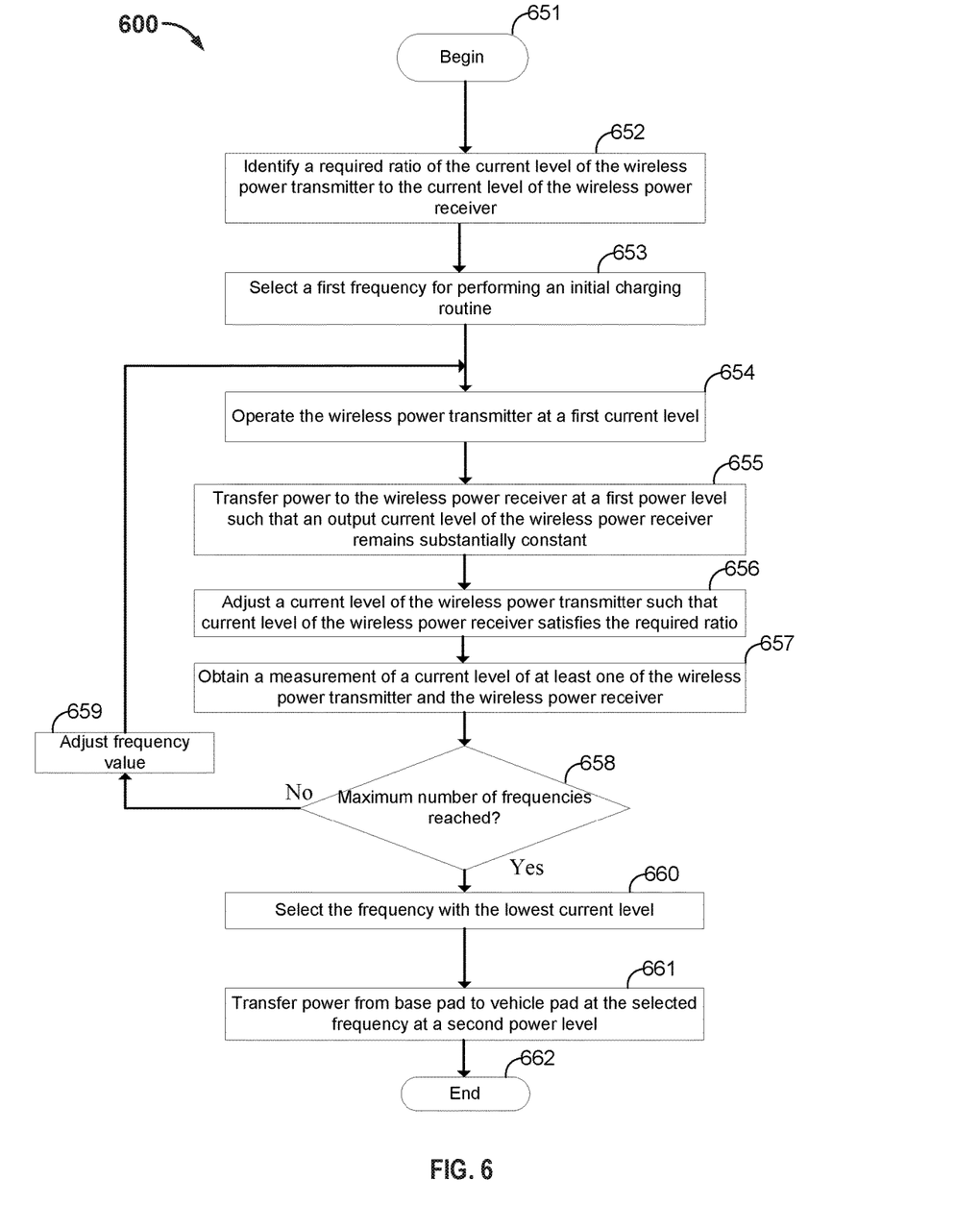
FIG. 6 is a flowchart of an exemplary method of an initial charging routine for finding an ideal operating frequency at a first or low power level, in accordance with another example implementation.

FIG. 6 is a flowchart depicting a method 600 for determining an ideal operating frequency. The method shown in FIG. 6 may be implemented via one or more devices in the wireless power transfer systems 100-400 similar to the base wireless power charging system 102, 202, 302, and the base pad 402 of FIGS. 1-4. Although the method 600 is described herein with reference to a particular order, in various implementations, blocks herein may be performed in a different order, or omitted, and additional blocks may be added.

The method 600 begins at block 651 after the base pad 402 has completed an alignment process with the vehicle pad 414. At block 652 the base pad 402 identifies a required ratio of a current level of the wireless power transmitter to a current level of the wireless power receiver. In some aspects, the required ratio may be a predefined value stored in the base controller 342 or may be communicate between the base communication system 372 and the electric vehicle communication system 374 over the communication link 376. At block 653, the base pad 402 may select a first frequency (e.g., 90 kHz) for performing an initial charging routine for finding an ideal operating frequency. In some aspects, the base controller 342 may identify the first frequency from a predetermined value or may calculate an appropriate first frequency value based at least in part on the type, configuration, size, or other parameter or characteristic of the base pad 402 and/or vehicle pad 414.

At block 654, the base controller 342 may operate the base pad 402 at a first current level. In some aspects, the first current level may be a fraction of the maximum base pad current $I_{BP}$ 405 (e.g., ⅓ or ¼ of $I_{BP\_max}$). In some embodiments, the vehicle pad 414 may control the output current $I_{DC}$ 432 to a constant value during block 654. In some aspects, the constant value for the output current $I_{DC}$ 432 may be a fraction of the output current $I_{DC}$ 432 produced when receiving a second power level (e.g., ¼ or ⅓ of normal charging power level). At block 655, the base pad 402 transfers power at a first power level via the base transmit circuit 406 to the vehicle pad 414 so as to satisfy the required ratio while maintaining a constant output current $I_{DC}$ 432 value. In some aspects, at block 656 in order to satisfy the required ratio the vehicle pad 414, via the active tuning circuit 430, and the base pad 402, via the adjustable input voltage source $V_{in}$ 408, may adjust the vehicle pad current $I_{VP}$ 419 and/or the base pad current $I_{BP}$ 405 until the required ratio is satisfied (e.g., $I_{VP}$419=ratio*$I_{BP}$ 405). Once the output current $I_{DC}$ 432 remains constant and the required ratio is satisfied, at block 657 the base pad 402 obtains a measurement of the vehicle pad current $I_{VP}$ 419 and/or the base pad current $I_{BP}$ 405 and stores that measure current value. In some aspects, the vehicle pad 414 measures the vehicle pad current $I_{VP}$ 419 and transmits the measurement to the base pad 402. In some aspects, the base controller 342 obtains the measurement of the base pad current $I_{BP}$ 405.

At block 658, the base pad 402 determines whether a maximum number of frequencies used in the initial charging routine has been reached. If not, then at block 659, the base pad 402 adjusts the first frequency to a second frequency value and returns to block 654 to perform blocks 654, 655, 656 at the second frequency. In some aspects, the first frequency may be 90 kHz and the base pad 402 may adjust the first frequency and perform steps blocks 654, 655, 656 until a frequency of 81.3 kHz is reached, however, other frequency ranges and values are possible. In some aspects, the maximum number of frequencies used as part of the initial charging routine may predetermined by the manufacturers of the base pad 402 and/or vehicle pad 414 or may be communicated between the base pad 402 and the vehicle pad 414. If the maximum number of frequencies has been reached, then at block 660, the base controller 342 may select the frequency which had the lowest vehicle pad current $I_{VP}$ 419 and/or the base pad current $I_{BP}$ 405 value obtained in block 657 for each of the frequencies checked as the ideal operation frequency. At block 661, the base pad 402 may transfer power to the vehicle pad 414 at the selected frequency at a second power level, the second power level being higher than the first power level. In some aspects, the second power level is a power level used during normal charging of the electric vehicle 112. At block 662, the method ends.

In one aspect, the base pad 402 comprises during a first time period, means for transmitting power at a first power level from a wireless power transmitter to the wireless power receiver. In some embodiments, the transmitting means may comprise the base system induction coil 104, 204, 304, base pad induction coil $L_1$ 404, or transmit circuit 406 of FIGS. 1-4. The base pad 402 further comprises means for determining a frequency for transmitting power at the first power level wherein determining the frequency is based on a required ratio of a current level of the wireless power receiver to a current level of a wireless power transmitter. In some embodiments, the determining means may comprise the base controller 342 FIG. 3 or a controller or processor or a similar component configured to receive and analyze information received, where the information may include data or indicative inputs. The base pad 402 further comprises during a second time period, means for transmitting power at a second power level and at the frequency, the first power level lower than the second power level. In some embodiments, the transmitting means may comprise the base system induction coil 104, 204, 304, base pad induction coil $L_1$ 404, or transmit circuit 406 of FIGS. 1-4.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the embodiments of the present disclosure.

The various illustrative blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor can read information from, and write information to, the storage medium. In the alternative, the storage medium may be integral to the processor. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer readable media. The processor and the storage medium may reside in an ASIC. For purposes of summarizing the disclosure, certain aspects, advantages and novel features of the present disclosure have been described herein. It is to be understood that not necessarily all such advantages may be achieved in accordance with any particular embodiment of the present disclosure. Thus, the present disclosure may be embodied or carried out in a manner that achieves or optimizes one advantage or group of advantages as taught herein without necessarily achieving other advantages as may be taught or suggested herein.

Various modifications of the above described embodiments will be readily apparent, and the generic principles defined herein may be applied to other embodiments without departing from the spirit or scope of the present disclosure. Thus, the present disclosure is not intended to be limited to the embodiments shown herein but is to be accorded the widest scope consistent with the principles and novel features disclosed herein.

What is claimed is:

1. A method for wirelessly transmitting power to power or charge a wireless power receiver, the method comprising:
  during a first time period, transmitting power at a first power level from a wireless power transmitter to the wireless power receiver;
  determining a frequency for transmitting power at a second power level based on a ratio of a current level of the wireless power receiver to a current level of a wireless power transmitter at the first power level;
  during a second time period, transmitting power at the second power level and at the frequency, the first power level lower than the second power level.

2. The method of claim 1, wherein determining the frequency comprises:
  identifying the ratio of the current level of the wireless power transmitter to the current level of the wireless power receiver;

at a first frequency:
   operating the wireless power transmitter at a first current level,
   transferring power to the wireless power receiver such that the current level of the wireless power receiver satisfies the ratio, and
   obtaining a measurement of a first output current level at the wireless power receiver;
at a second frequency:
   operating the wireless power transmitter at the first current level,
   transferring power to the wireless power receiver such that the current level of the wireless power receiver satisfies the ratio,
   obtaining a measurement of a second output current level at the wireless power receiver;
   comparing the first output current level with the second output current level; and
selecting the first or second frequency based on the comparison.

3. The method of claim 1, wherein determining the frequency comprises:
identifying the ratio of the current level of the wireless power transmitter to the current level of the wireless power receiver;
at a first frequency:
   operating the wireless power transmitter at a first current level,
   transferring power to the wireless power receiver such that an output current level of the wireless power receiver remains substantially constant,
   adjusting the first current level of the wireless power transmitter such that the current level of the wireless power receiver satisfies the ratio,
   measuring the first current level of the wireless power transmitter at the ratio;
at a second frequency:
   operating the wireless power transmitter at a second current level,
   transferring power to the wireless power receiver such that an output current level of the wireless power receiver remains substantially constant,
   adjusting the second current level of the wireless power transmitter such that the current level of the wireless power receiver satisfies the ratio,
   measuring the second current level of the wireless power transmitter at the ratio;
   comparing the first current level with the second current level; and
selecting the first or second frequency based on the comparison.

4. The method of claim 1, wherein a ratio of a first current level of the wireless power receiver to a first current level of the wireless power transmitter at the first power level is the same as a ratio of a second current level of the wireless power receiver to a second current level of the wireless power transmitter at the second power level.

5. The method of claim 1, wherein the ratio is based on predefined maximum current levels of the wireless power transmitter and the wireless power receiver.

6. The method of claim 1, wherein the ratio is based on maximum current levels of the wireless power transmitter and the wireless power receiver communicated between the wireless power transmitter and the wireless power receiver.

7. The method of claim 1, wherein the first power level is a fraction of the second power level.

8. The method of claim 1, wherein determining the frequency comprises:
determining a number of frequency adjustments during the first time period;
for each of the number of frequency adjustments:
   transferring power to the wireless power receiver based on the ratio, and
   obtaining a measurement of a output current level at the wireless power receiver; and
selecting the frequency with the highest measurement of the output current level at the wireless power receiver.

9. The method of claim 1, wherein determining the frequency comprises:
determining a number of frequency adjustments during the first time period;
for each of the number of frequency adjustments:
   transferring power to the wireless power receiver based on the ratio, and
   obtaining a measurement of a current level of the wireless power transmitter; and
selecting the frequency with the lowest measurement of the current level of the wireless power transmitter.

10. An apparatus for wirelessly transmitting power to power or charge a wireless power receiver, comprising:
a transmit circuit configured to, during a first time period, transmit power at a first power level to the wireless power receiver; and
a processor circuit configured to determine a frequency for transmitting power at a second power level based on a ratio of a current level of the wireless power receiver to a current level of the transmit circuit at the first power level, wherein the transmit circuit is further configured to, during a second time period, transmit power at a second power level and at the frequency, the first power level lower than the second power level.

11. The apparatus of claim 10, wherein the processor circuit is further configured to:
identify the ratio of the current level of the wireless power transmitter to the current level of the wireless power receiver;
at a first frequency:
   operate the transmit circuit at a first current level to transfer power to the wireless power receiver such that the current level of the wireless power receiver satisfies the ratio, and
   obtain a measurement of a first output current level at the wireless power receiver;
at a second frequency:
   operate the transmit circuit at the first current level to transfer power to the wireless power receiver such that the current level of the wireless power receiver satisfies the ratio,
   obtain a measurement of a second output current level at the wireless power receiver;
   compare the first output current level with the second output current level; and
select the first or second frequency based on the comparison.

12. The apparatus of claim 10, wherein the processor circuit is further configured to:
identify the ratio of the current level of the transmit circuit to the current level of the wireless power receiver;
at a first frequency:
   operate the transmit circuit at a first current level to transfer power to the wireless power receiver such that an output current level of the wireless power receiver remains substantially constant, adjust the first current level of the wireless power transmitter such that the current level of the wireless power receiver satisfies the ratio,
measure the first current level of the wireless power transmitter at the ratio;
at a second frequency:
operate the transmit circuit at a second current level to transfer power to the wireless power receiver such that an output current level of the wireless power receiver remains substantially constant,
adjust the second current level of the transmit circuit such that the current level of the wireless power receiver satisfies the ratio,
measure the second current level of the transmit circuit at the ratio;
compare the first current level with the second current level; and
select the first or second frequency based on the comparison.

13. The apparatus of claim 10, wherein a ratio of a first current level of the wireless power receiver to a first current level of the transmit circuit at the first power level is the same as a ratio of a second current level of the wireless power receiver to a second current level of the transmit circuit at the second power level.

14. The apparatus of claim 10, wherein the ratio is based on predefined maximum current levels of the transmit circuit and the wireless power receiver.

15. The apparatus of claim 10, wherein the ratio is based on maximum current levels of the transmit circuit and the wireless power receiver communicated between the apparatus and the wireless power receiver.

16. The apparatus of claim 10, wherein the first power level is a fraction of the second power level.

17. The apparatus of claim 10, wherein the processor circuit is further configured to:
determine a number of frequency adjustments during the first time period;
for each of the number of frequency adjustments:
operate the transmit circuit to transfer power to the wireless power receiver based on the ratio, and
obtain a measurement of a output current level at the wireless power receiver; and
select the frequency with a highest measurement of the output current level at the wireless power receiver.

18. The apparatus of claim 10, wherein the processor circuit is further configured to:
determine a number of frequency adjustments during the first time period;
for each of the number of frequency adjustments:
operate the transmit circuit to transfer power to the wireless power receiver based on the ratio, and
obtain a measurement of a current level of the transmit circuit; and
select the frequency with a lowest measurement of the current level of the transmit circuit.

19. An apparatus for wirelessly transmitting power to power or charge a wireless power receiver, comprising:
means for transmitting power at a first power level, during a first time period, to the wireless power receiver;
means for determining a frequency for transmitting power at a second power level based on a ratio of a current level of the wireless power receiver to a current level of the transmitting means at the first power level;
means for transmitting power at the second power level and at the frequency, during a second time period, the first power level lower than the second power level.

20. The apparatus of claim 19, further comprising:
means for identifying the ratio of the current level of the transmitting means to the current level of the wireless power receiver;
at a first frequency:
means for operating the transmitting means at a first current level,
means for transferring power to the wireless power receiver such that the current level of the wireless power receiver satisfies the ratio, and
means for obtaining a measurement of a first output current level at the wireless power receiver;
at a second frequency:
means for operating the transmitting means at the first current level,
means for transferring power to the wireless power receiver such that the current level of the wireless power receiver satisfies the ratio,
means for obtaining a measurement of a second output current level at the wireless power receiver;
means for comparing the first output current level with the second output current level; and
means for selecting the first or second frequency based on the comparison.

21. The apparatus of claim 19, further comprising:
means for identifying the ratio of the current level of the transmitting means to the current level of the wireless power receiver;
at a first frequency:
means for operating the transmitting means at a first current level,
means for transferring power to the wireless power receiver such that an output current level of the wireless power receiver remains substantially constant,
means for adjusting the first current level of the transmitting means such that the current level of the wireless power receiver satisfies the ratio,
means for measuring the first current level of the transmitting means at the ratio;
at a second frequency:
means for operating the transmitting means at a second current level,
means for transferring power to the wireless power receiver such that an output current f the wireless power receiver remains substantially constant,
means for adjusting the second current level of the transmitting means such that the current, level of the wireless power receiver satisfies the ratio,
means for measuring the second current level of the transmitting means at the ratio;
means for comparing the first current level with the second current level; and
means for selecting the first or second frequency based on the comparison.

22. The apparatus of claim 19, wherein a ratio of a first current level of the wireless power receiver to a first current level of the transmitting means at the first power level is the same as a ratio of a second current level of the wireless power receiver to a second current level of the transmitting means at the second power level.

23. The apparatus of claim 19, wherein the ratio is based on predefined maximum current levels of the transmitting means and the wireless power receiver.

24. The method of claim 1, wherein the ratio is based on maximum current levels of the transmitting means and the wireless power receiver communicated between the transmitting means and the wireless power receiver.

25. The apparatus of claim 19, wherein the first power level is a fraction of the second power level.

26. A non-transitory computer readable storage medium comprising instructions that when executed cause an apparatus to perform a method for wirelessly transmitting power to a wireless power receiver, comprising:
during a first time period, transmitting power at a first power level from a wireless power transmitter to the wireless power receiver;
determining a frequency for transmitting power at a second power level based on a ratio of a current level of the wireless power receiver to a current level of a wireless power transmitter at the first power level;
during a second time period, transmitting power at the second power level and at the frequency, the first power level lower than the second power level.

27. The medium of claim 26, wherein determining the frequency comprises:
identifying the ratio of the current level of the wireless power transmitter to the current level of the wireless power receiver;
at a first frequency:
operating the wireless power transmitter at a first current level,
transferring power to the wireless power receiver such that the current level of the wireless power receiver satisfies the ratio, and
obtaining a measurement of a first output current level at the wireless power receiver;
at a second frequency:
operating the wireless power transmitter at the first current level,
transferring power to the wireless power receiver such that the current level of the wireless power receiver satisfies the ratio,
obtaining a measurement of a second output current level at the wireless power receiver;
comparing the first output current level with the second output current level; and
selecting the first or second frequency based on the comparison.

28. The medium of claim 26, wherein determining the frequency comprises:
identifying the ratio of the current level of the wireless power transmitter to the current level of the wireless power receiver;
at a first frequency:
operating the wireless power transmitter at a first current level,
transferring power to the wireless power receiver such that an output current level of the wireless power receiver remains substantially constant,
adjusting the first current level of the wireless power transmitter such that the current level of the wireless power receiver satisfies the ratio,
measuring the first current level of the wireless power transmitter at the ratio;
at a second frequency:
operating the wireless power transmitter at a second current level,
transferring power to the wireless power receiver such that an output current level of the wireless power receiver remains substantially constant,
adjusting the second current level of the wireless power transmitter such that the current level of the wireless power receiver satisfies the ratio,
measuring the second current level of the wireless power transmitter at the ratio;
comparing the first current level with the second current level; and
selecting the first or second frequency based on the comparison.

29. The medium of claim 26, wherein a ratio of a first current level of the wireless power receiver to a first current level of the wireless power transmitter at the first power level is the same as a ratio of a second current level of the wireless power receiver to a second current level of the wireless power transmitter at the second power level.

30. The medium of claim 26, wherein the ratio is based on predefined maximum current levels of the wireless power transmitter and the wireless power receiver.

* * * * *